United States Patent Office 3,658,911
Patented Apr. 25, 1972

3,658,911
PRODUCTION OF 2-METHYLHEPTEN-2-EN-6-ONE
Horst Pommer, Ludwigshafen, Herbert Mueller, Frankenthal, and Harald Koehl and Hermann Overwien, Ludwigshafen, Germany, assignors to Badische Anilin- & Soda-Fabrik Aktiengesellschaft, Ludwigshafen (Rhine), Germany
No Drawing. Filed Oct. 2, 1968, Ser. No. 764,646
Claims priority, application Germany, Oct. 4, 1967,
P 16 43 668.3
Int. Cl. C07c 49/20
U.S. Cl. 260—593 R    3 Claims

ABSTRACT OF THE DISCLOSURE

Production of 2-methylhept-2-en-6-one which is important for organic synthesis by isomerization of 2-methylhept-1-en-6-one using as catalyst an iron carbonyl compound, a zerovalent element of 8 of the Periodic System, some of the carbonyl groups if desired being replaced by other neutral ligands.

The present invention relates to a new process for the production of 2-methylhept-2-en-6-one (I).

It is generally known that olefinically unsaturated carbonyl compounds can be isomerized either by shifting the carbon-carbon double bond using various types of catalytically active compounds or thermally.

Previous attempts to isomerize 2-methylhept-1-en-6-one (II) into 2-methylhept-2-en-6-one (I) have proved to be unsatisfactory because of numerous secondary reactions. Thus for example in the isomerization of (II) with sulfuric acid, mainly carbocyclic compounds are obtained instead of the desired isomers (I) (cf. J. Am. Chem. Soc., 80,5266 (1958)).

The object of the present invention is to make 2-methylhept-2-en-6-one more readily and cheaply accessible.

We have now found that 2-methylhepten-1-en-6-one can be unexpectedly isomerized in outstanding yields into 2-methylhepten-2-en-6-one by using, as the isomerization catalyst, an iron carbonyl compound in which some of the carbonyl groups may be replaced by other neutral ligands.

Iron pentacarbonyl is particularly preferred from among the carbonyl compounds defined. Carbonyl compounds which bear ligands having tertiary basic nitrogen atoms or phosphorus atoms instead of one or more carbon monoxide molecules, for example bis-triphenyl phosphine iron tricarbonyl or tripyridino diiron tetracarbonyl, are however also suitable.

The amount of carbonyl compound required for isomerization is 0.1 to 20%, preferably 1 to 5%, by weight with reference to the amount of (II). It is possible to use larger or smaller amounts of these catalysts, however, the isomerization then being faster or slower.

The reaction may be carried out a temperatures of 100 to 250° C., preferably 140 to 200° C., at atmospheric or superatmospheric pressure, for example up to 50 atmospheres, with or without solvents and batchwise or continuously.

Hydrocarbons which are liquid under the prevailing reaction conditions, for example hexane, heptane, ligroin, benzene, toluene or xylene, are particularly suitable as solvents. High boiling point ethers such as diphenyl ether, 2,2'-dimethoxydiethyl ether and 2,2'-diethoxydiethyl ether, are also suitable.

Since the methylheptenones (I) and (II), being olefins, are susceptible to oxidation, it is advisable to exclude oxygen, for example by using an atmosphere of nitrogen or argon, if it is desired to prepare pure products.

When the isomerization is over, the reaction mixture can be worked up conventionally, preferably by distillation.

The product (I) is a valuable intermediate for organic synthesis, particularly for the production of compounds of the carotenoid series and perfumes.

The invention is illustrated by the following example.

EXAMPLE

A mixture of 500 g. of 2-methylhept-1-en-6-one and 10 g. of iron pentacarbonyl is heated at 20 atmospheres for two hours at 180° C. and the mixture is then worked up in a conventional manner.

Pure 2-methylhept-2-en-6-one is obtained in a yield of 93.7%; its boiling point is 171° C. at 760 mm.; $n_D^{25}=$ 1.4387.

We claim:
1. A process for the production of 2-methylhept-2-en-6-one by isomerization of 2-methylhept-1-en-6-one by means of an isomerization catalyst which comprises carrying out said isomerization at a temperature of 100 to 250° C. and a pressure of from 1 to 50 atmospheres using as the isomerization catalyst iron pentacarbonyl in an amount of from 0.1 to 20% by weight with reference to the amount of 2-methylhept-1-en-6-one.

2. A process as claimed in claim 1 wherein the amount of iron pentacarbonyl used is from 1 to 5% by weight.

3. A process as claimed in claim 1 carried out in the presence of a solvent.

References Cited

UNITED STATES PATENTS

| | | | |
|---|---|---|---|
| 2,837,577 | 6/1958 | Blaser et al. | 260—593 R |
| 3,391,216 | 7/1968 | Breckoff | 260—683.2 |
| 3,424,813 | 1/1969 | Breckoff et al. | 260—683.2 |
| 3,083,246 | 3/1963 | Holzman et al. | 260— 666 A |
| 3,363,014 | 1/1968 | Kittleman et al. | 260—666 A |

FOREIGN PATENTS

| | | | |
|---|---|---|---|
| 1,267,682 | 6/1968 | Germany | 260—593 R |

DANIEL D. HORWITZ, Primary Examiner

U.S. Cl. X.R.
252—431, 472

PO-1050
(5/69)

UNITED STATES PATENT OFFICE
CERTIFICATE OF CORRECTION

Patent No. 3,658,911               Dated April 25, 1972

Inventor(s) Horst Pommer et al

It is certified that error appears in the above-identified patent and that said Letters Patent are hereby corrected as shown below:

Column 1, line 19, delete "a zerovalent element of 8 of the Periodic System,".

Column 1, line 39, "2-methylhepten-1-en-6-one" should read -- 2-methylhept-1-en-6-one --; line 41, "2-methylhepten-2-en-6-one" should read -- 2-methylhept-2-en-6-one --.

Signed and sealed this 5th day of December 1972.

(SEAL)
Attest:

EDWARD M. FLETCHER, JR.            ROBERT GOTTSCHALK
Attesting Officer                   Commissioner of Patents